INVENTORS
DONALD M. GRAY
HOLLIS M. BURHANS &
WENDELL H. GRAY

ATTORNEYS

Nov. 4, 1969   D. M. GRAY ET AL   3,476,249
DUAL, PLEATED ELEMENT, FILTER CARTRIDGE
Filed Oct. 6, 1967   2 Sheets-Sheet 2

INVENTORS
DONALD M. GRAY
HOLLIS M. BURHANS &
WENDELL H. GRAY
BY

ATTORNEYS

United States Patent Office 3,476,249
Patented Nov. 4, 1969

3,476,249
DUAL, PLEATED ELEMENT, FILTER CARTRIDGE
Donald M. Gray and Hollis M. Burhans, Kingston, and Wendell H. Gray, West Hurley, N.Y., assignors to W.G.B. Oil Clarifier, Inc., Kingston, N.Y., a corporation of New York
Filed Oct. 6, 1967, Ser. No. 673,347
Int. Cl. B01d 27/04
U.S. Cl. 210—188                6 Claims

ABSTRACT OF THE DISCLOSURE

A full flow oil filter having two full flow elements positioned in concentric relation one within the other with the oil flowing from an inlet into an annular space between the filtering elements and from said annular space through each of the filtering elements to a common outlet.

BACKGROUND OF THE INVENTION

The invention relates to the field of oil filters of the type having a cartridge adapted for the filtration of the lubricating oil of an internal combustion engine.

There have been provided various filters of the indicated type such as those disclosed in Patent Nos. 3,167,507 and 3,233,738.

SUMMARY OF THE INVENTION

The invention involves the provision of a full flow filter construction to provide as much filtering area as possible in as small a space as possible. Briefly stated, this is achieved by providing a filter cartridge comprising a pair of concentric annular filtering elements of pleated paper and means for directing oil to be filtered into an annular space between the filtering elements so that the oil flows outwardly through the outer full flow element and inwardly through the inner full flow element. The invention also involves various features of constructional details which provide for simplicity and economy of construction.

DESCRIPTION OF THE PREFERRED EMBODIMENT

Figure 1:
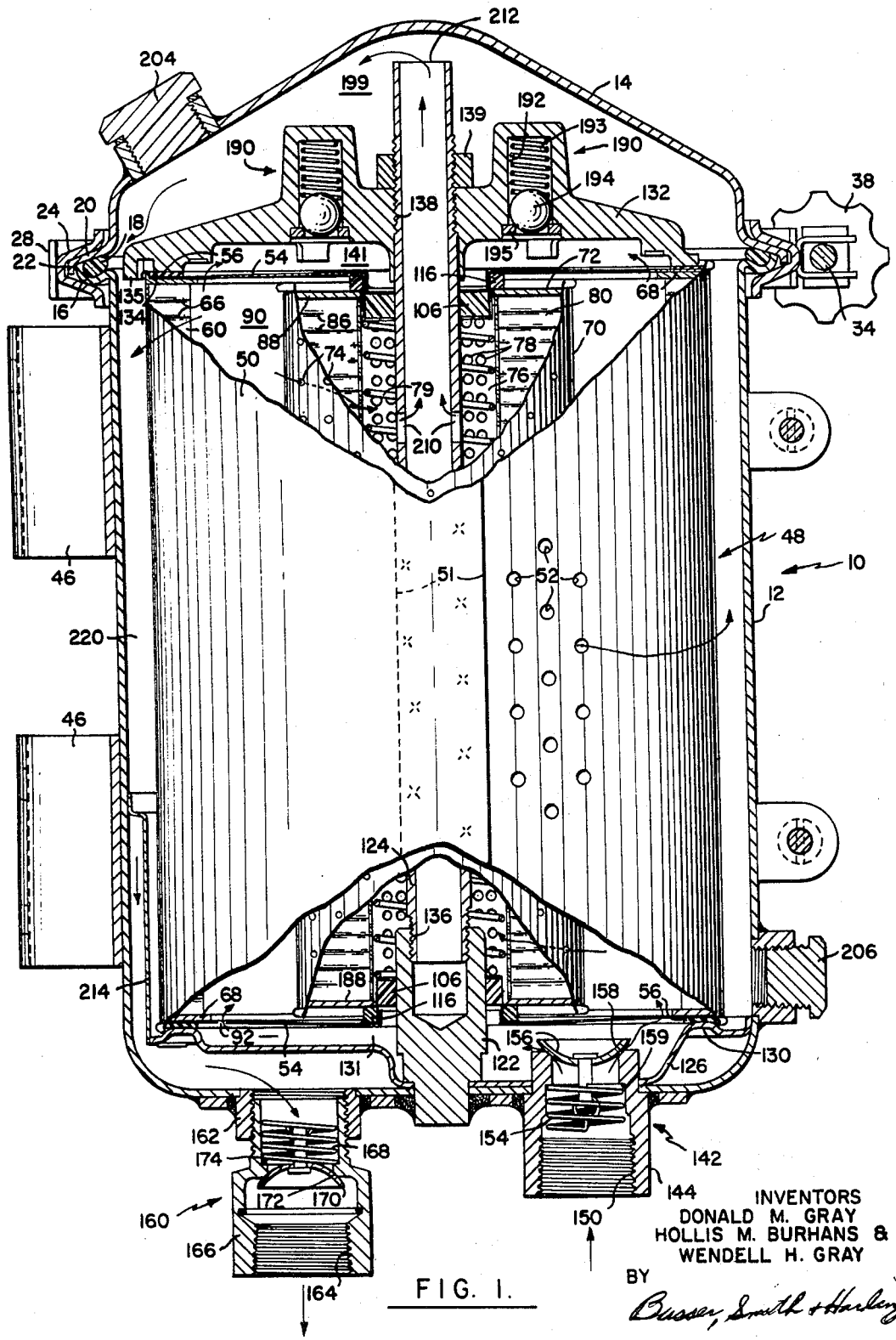
FIGURE 1 is an axial cross-section through a filter unit constructed in accordance with the invention, parts of the filter cartridge being broken away to clarify certain details of construction.
Figure 2:
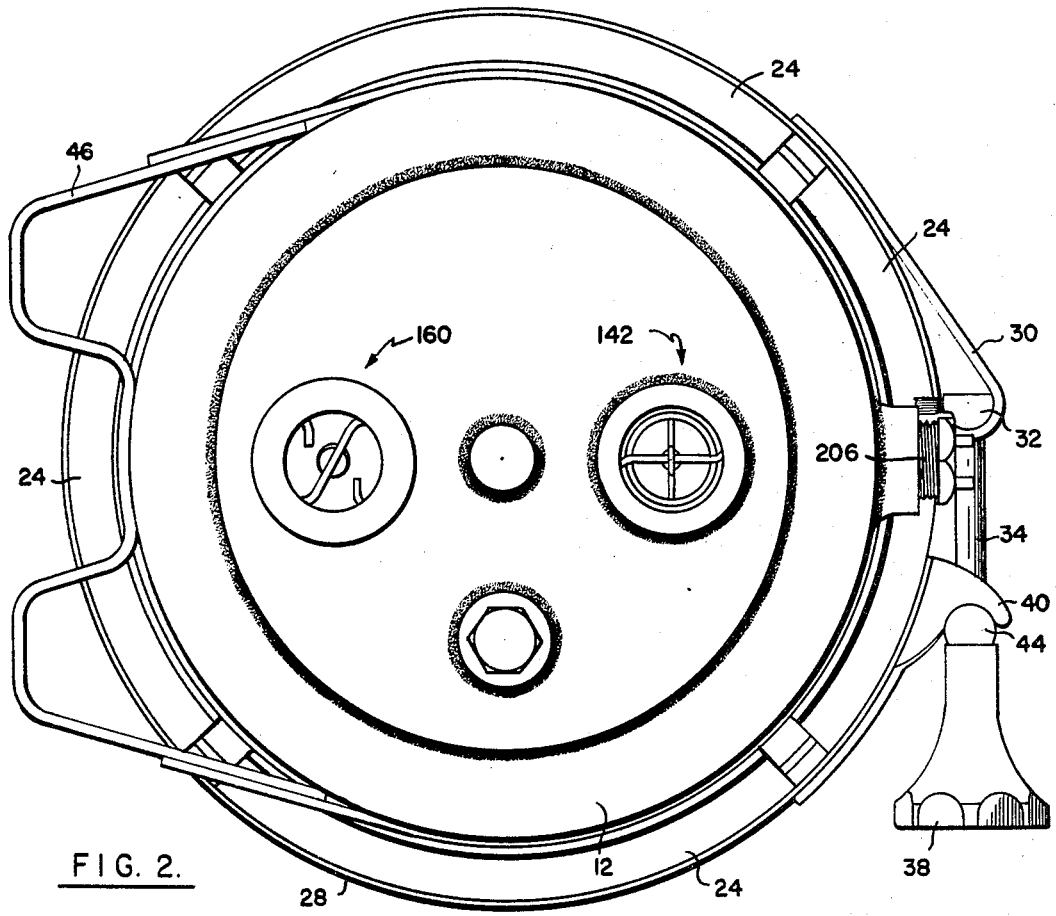
FIGURE 2 is a bottom view of the unit shown in FIGURE 1.

The filter constructed in accordance with the invention comprises a housing, generally designated 10, having a body section 12 and a cover section 14. At the upper end of the body section 12 there is a radially outwardly extending flange 16 arcuately shaped in transverse section to form a seat for an O-ring 18. At the lower end of the cover section 14 is a radially outwardly extending axially sloping flange 20 terminating in a portion 22. The flange 20 overlies the O-ring 18 and the flange 16, the portion 22 of the flange 20 extending about the flange 16.

For detachably securing the cover and body section together, four arcuately shaped clamp shoes 24 are fitted over the flanges 16 and 20. These shoes are V-shaped in transverse section and are adapted for camming together the flanges 16 and 20. Embracing the several shoes 24 is a band 28, one end portion of which is folded back upon itself to form a loop 30. This loop embraces the head 32 of the T-shaped bolt, the stem 34 of which extends freely through an aperture formed in the band 28 and has a nut 38 threaded on the free end thereof. Affixed to the opposite end of the band 28 is a bifurcated fitting 40 having a socket formed therein, the nut 38 being provided with a rounded end portion 44 seated in this socket. brackets for mounting the unit are indicated at 46. The above details are more fully illustrated in said above-mentioned patents.

Within housing 10 is a filter cartridge unit, generally designated 48. This unit comprises a cylindrical outer cam body 50 made of light weight sheet metal. The body 50 is provided with a longitudinally extending lapped seam 51 spot-welded along the full length thereof. The body 50 is provided with perforations 52 throughout the aggregate area of the perforations being well in excess of that of the oil inlet. At each end of the body 50 is a cover 54 set back from the end of the body 50. The periphery of the cover 54 is rolled about the end of the body 50 and tucked into a recess formed by body 50, to form a tight seam. Adhesively secured to the cover 54 is a flat neoprene ring seal or gasket 56.

Figure 4:
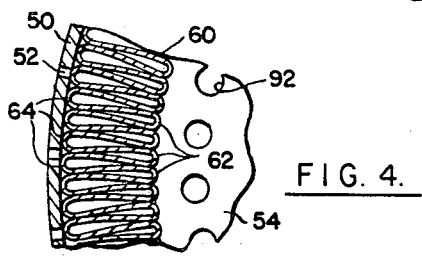
FIGURE 4 is a fragmentary view of a detail.

Within the body 50 is a cylindrical full-flow filter element 60 made of paper impregnated with a suitable substance. Referring particularly to FIGURE 4, the filter element 60 comprises tightly packed, narrow pleats with inner folds 62 and outer folds 64 at the juncture of adjacent pleats. The pleats extend along the axis of the filter and have transversely extending, axially spaced ribs 66 formed thereon to provide spacing between adjacent pleats as is best shown in FIGURE 1. The filter element 60 is provided with a large number of pleats so that there is a compact structure with adjacent pleats being in contact at the opposed rib portions thereof. The inner folds 62 are somewhat sharper than the outer folds 64 since there are an equal number of inner and outer folds but the inner folds are located along a smaller circumference. Each end of the filter element 60 is adhesively secured to a flat paper ring 68.

Within the body 50 is a cylindrical inner can body 70 made of a light weight sheet metal and having a diameter smaller than the internal diameter of the filter element 60. Each end of the body 70 is provided with a cover 72 secured to the body 70 in the same manner that the covers 54 are jointed to the body 50. The body 70 is provided with perforations 74 through the surface thereof and contains a cylindrical full flow filtering element 80 of pleated paper such as that of the filter element 60 except that the filter element 80 has a larger radial extent as is best shown in FIGURE 1. Thus, the filter element 80 comprises tightly packed pleats, with inner and outer folds at the juncture of adjacent pleats. The pleats extend along the axis of the filter and have transverse extending ribs 86 formed thereon to provide spacing between adjacent pleats. Each end of the filter element 80 is adhesively secured to a flat paper ring 88.

Positioned within the internal folds of the filter element 80 is a thin metal center tube 76 having a plurality of holes 78 throughout the surface thereof. Positioned within the center tube 76 is a center spring 79. The center spring 79 serves to reinforce the inner filter element against the pressures developed during filtering, which pressures could be sufficient to collapse the tube 76 and the filter element 80.

An annular chamber 90 is formed by the space between the can body 70 and the filter element 60. A plurality of openings 92 are formed in each of the cover plates 54 and are circumferentially spaced about the cover plate to communicate with the upper and lower ends of the annular chamber 90.

Novel aspects of the invention are involved in the manner whereby the inner and outer filter cans are secured together to form a dual flow cartridge. Since in assembly the two filter cans are provided in completed condition with their covers 54 and 72 secured at their outer ends of the cylinders 50 and 70, respectively, with the filtering elements 60 and 80 positioned therein, the problem arises as to how to incorporate the inner filter can concentrically within the outer filter can in a secured position. Moreover, it is essential that an effective seal be provided to prevent the flow of oil from the annular space 90 around the ends of the inner can to the interior of tube 76.

Figure 3:
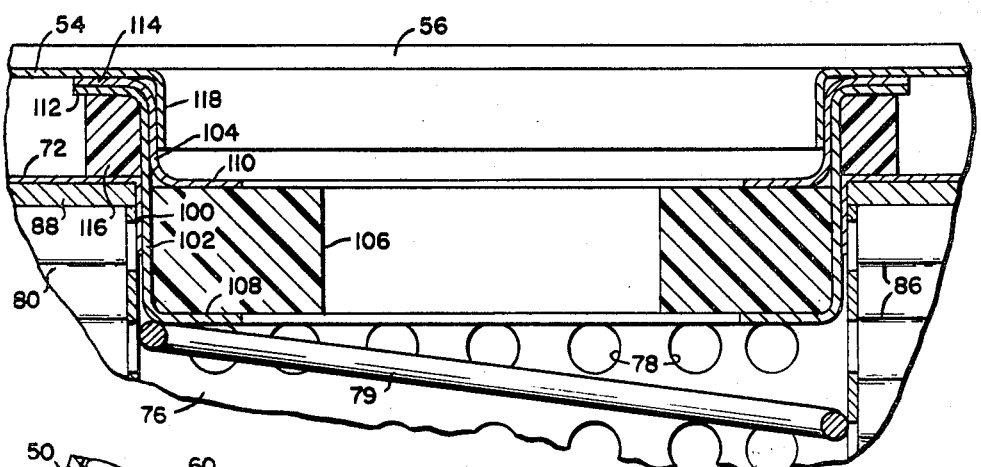
FIGURE 3 is an enlarged cross-section of a structural detail of the filter cartridge shown in FIGURE 1.

This aspect of the invention will be described with particular reference to FIGURE 3 wherein the construction at the upper end of the filter cartridge is shown. This description will include only a detailed description of the construction at the upper end since the construction at the lower end of the filter cartridge is essentially identical.

In the assembled condition of the inner filter can, the cover 72 is bent inwardly around the internal opening of the annular ring 88 to provide a cylindrical portion 100 which extends along and in contact with the end of the tube 76. Since the portion 100 extends within the tube 76, it serves to hold the same in its position within the filter paper 80. A gasket holding means is positioned within the portion 100 as shown in FIGURE 3, the gasket holding means comprising a pair of cup-shaped inserts 102 and 104 nested together and holding an annular gasket 106 between radially extending portions 108 and 110, respectively. The inserts 102 and 104 have overlapping outwardly extending flanges 112 and 114, respectively. A gasket 116 is positioned between the lower flange 112 and the cover 72 to provide a seal therebetween. The cover 54 is bent inwardly around and in contact with the upper end of the insert 104 to provide a portion 118 extending along the cylindrical portion of the insert 104.

By reason of the engagement between the covers 54 and 72 and the cup-shaped inserts 102 and 104, the inner and outer cans are held in the spaced position shown, the inner can being concentrically located within the outer can. Moreover, the gasket 116 positioned between the cover 72 and the flange 112 of insert 102 serves to provide an effective seal to prevent the flow of oil around the end of the inner can.

Carried by the body 12 is means, generally indicated 120, for mounting the filter cartridge unit 48 at its lower end. This means comprises a support post 122 extending through the bottom wall of the body 12 and affixed thereto, as by welding. Threaded into the upper end portion of the post 122 is the lower end portion of a tubular center post 124. The upper end portion of the post 122 extends through the central opening in the annular gasket 106 in sealing contact therewith. Fitted over the post 122 is a dished plate 126 secured in position by being held between a shoulder on post 122 and the bottom wall of body 12. The plate 126 is provided with a raised, flat annular rim 130, upon which is seated the associated gasket 56. It will be observed that between the plate 126 and the overlapping cover 54 is a chamber 131 communicating with the openings 92 formed in the cover 54. At the upper end of the cartridge is a top support member or head 132. The head 132 has a generally circular shape and is provided with a flat annular rim 134 which cooperates with a gasket 56 for sealing the upper end of the cartridge. Head 132 has three circumferentially spaced flanges 135 which serve to locate the head 132 centrally with respect to the cartridge unit. Between the head 132 and the cover 54 and extending about the member 132 is a chamber 141 communicating with the openings 92 formed in the upper cover 54.

The center post 124 is provided with externally threaded portions 136 and 138 which threadedly engage cooperating threaded portions in support post 122 and a central opening in head 132, respectively. A nut 139 also engages threaded portion 138 and is used for assembling the head 132 on the upper end of the filter cartridge.

The body 12 is provided with an inlet valve assembly, generally designated 142. The inlet valve 142 is a check valve which permits flow through the valve in the direction into the filter and prevent any flow out of the filter. The inlet valve 142 compresses a body 144 which is secured to body 12 by welding and extends through the bottom of the body 12 and through the plate 126. The lower end portion of the valve body 144 is threaded, as at 150, for connection to a supply line. A spring 154 is connected to a spherical valve member 156 which is adapted for contact with a conforming valve seat 158. The spring 154 acts against a shoulder 159 formed on body 144 to thereby bias the valve member 158 into contact with the valve seat 158 to maintain the valve in the closed position.

The body 12 is also provided with an outlet valve assembly, generally designated 160. The outlet valve is a check valve which permits flow through the valve in the direction out of the filter and also serves to hold oil in the filter when oil is not being pumped into the filter. The outlet valve 160 comprises a member 162 extending through the bottom wall of the body 12 and secured thereto by welding. Threaded onto the lower end portion of the member 162 is a coupling 166. The lower end portion of coupling 166 is threaded as at 164 for connection to a discharge line. A spring 168 is connected to a spherical valve member 170 which is arranged for contact with a conforming valve seat 172. The spring 168 acts against a shoulder 174 formed on coupling 166 to thereby bias the valve member 170 into contact with the valve seat 172 to maintain the valve in the closed position. The spring 168 is strong enough to hold the valve closed against the weight of the oil in the filter, but will permit the valve to open when oil is pumped into the filter during an operating condition.

The top support head 132 mounts a plurality of relief valves, generally designated 190. These valves 190 are of the type described more fully in said prior-mentioned patents. For each valve, a dome is formed in the head 132 and a chamber therein is defined by a bore 192 drilled from the underside. A compression coil spring 193 and a metal ball 194 each having a diameter slightly less than the bore are received therein. Ball 194 is urged by the compressed spring 193 against a ring 195 providing a spherical valve seat. Ring 195 is retained in an enlarged bore and constitutes the valve inlet port. Outlet ports are defined by passages (not shown) which communicate with bore 192 and are provided by drilling transversely through the sides of dome, it being noted that in its normal valve-closing condition the ball 194 rests on the seat in a position opposite these outlet passages. The outlet passages lead to a chamber 199 at the top of cover section 14 and thereby communicate with the anti-draining outlet valve assembly 160 as will be described hereafter.

The pressure differential relief valves 190 are employed to by-pass oil around the filter sections when the oil pressure within the chamber 141 is undesirably high. Each valve 190 is spring loaded for opening in response to a given pressure differential, although the valves may be set to open at different differential pressures if desired. Typically each of the relief valves may be set to be opened by a pressure differential greater than approximately 45 p.s.i. The pressure differential depends, of course, upon the engine upon which the filter unit is mounted.

In the operation of each valve 190, as the pressure differential increases beyond a given level, ball 194 is lifted from its seat. As ball 194 rises, the obstruction to flow through the outlet passages and through the valve seat is lessened, and vice versa as ball 194 moves downwardly.

The cover 14 is provided with an opening normally closed by a plug 204, and the body 12 is provided with an opening normally closed by a plug 206. Plug 204 is removed so that its fitting may be used for filling of the filter after the changing of a cartridge. This filling should be effected before the engine is started. Plug 206 is used for draining the filter.

The center tube 124 is provided with two large holes 210 which provide ports for the flow of oil from the chamber within tube 76 to the interior of the center tube 124. The upper end 212 of the center tube 124 terminates in the chamber 199 and is open to direct the flow of oil from the interior tube 124 into the upper portion of chamber 199. The purpose of the arrangement will be discussed hereafter.

There is provided means for preventing dirt particles which may fall into the filter during cartridge changes from getting into the oil system, such means comprising the specially construction support plate 126 and a standpipe 214. The support plate 126 is constructed to seal off the bottom of the filter completely so that any dirt particles which fall into the filter will come to rest on the support plate. The standpipe 214 nests within a cut-out in plate 126 and extends axially along the inner wall of body 12 to provide outlet openings at a location above the plate 126. By this arrangement the oil in the filter must rise to a level above the support plate 126 before it can pass to the outlet valve. Since any dirt particles which may have fallen into the filter would rest on the support plate, these dirt particles will not rise to the outlet opening provided by the standpipe and cannot get into the oil system.

The details of the arrangement for preventing dirt particles from getting into the oil system are described fully in said prior Patent 3,167,507.

In the operation of the filter, oil is delivered from the crankcase of the engine under pressure by way of the usual lubricating oil pump. The flow is indicated by the arrows in FIGURE 1. The oil flows through the check valve 156 into an inlet chamber 131 at the bottom of the filter and passes through the plurality of circumferentially spaced ports 92 in the bottom cover 54 into the annular chamber 90 between the tubular filter elements 60 and 80. As shown by the arrows in FIGURE 1, from chamber 90 the flow divides with some oil flowing outwardly through the filter element 60 into an outlet chamber 220 externally of cylinder 50 and oil flowing inwardly through the filter element 80 into the central chamber surrounding the tubular center post 124. The oil which has been filtered by the filter element 60 passes from the chamber 220 through the openings in the standpipe 214 and outlet valve 160 to the engine bearings from which the oil returns to the crankcase. The oil which has been filtered by the filter element 80 passes from the central chamber through the ports 210 at the upper end of the center post 124 and upwardly through the interior of the center post 124 to chamber 199 from which the oil flows to chamber 220 and outlet valve 160.

The oil which enters the annular chamber 90 is under a substantial pressure which is provided by the pump. Accordingly, this oil flows upwardly through the annular chamber at a substantial velocity and with a turbulent flow to thereby wash the surfaces of the filters by dislodging large particles thereon. Oil also flows from chamber 90 through a plurality of circumferentially spaced openings at the upper end of this chamber into an upper chamber 141. Accordingly, the high inlet pressure is provided in both chambers 131 and 141. This high inlet pressure serves to provide an effective seal between the filter elements and the center post 124. This high inlet pressure acting upon the gaskets 106 presses each of them against the base of the associated insert, as a consequence of which the gaskets 106 are compressed and tend to increase in outside diameter and decrease in inside diameter. Thus, the gaskets 106 seal tightly against the cylindrical bodies of the inserts, the center post 124, and the greater the oil pressure in the chambers 131 and 141, the more the gaskets 106 are compressed and the tighter they seal. The sealing action of the gaskets 116 is also enhanced by the pressure condition described above.

The arrangement whereby the oil which flows inwardly through the filter element 80 is directed by tube 124 to be discharged into the top central portion of upper chamber 199 achieves the important function of bleeding air from the top of the filter. It is to be noted that the tube 124 is constructed to provide a substantial flow to the chamber 199 since a small flow would not achieve effective air bleeding. The reasons why it is important to keep air from accumulating in the filter are (1) when the filtering operation is stopped, accumulated air under pressure would force oil out of the filter through the outlet valve, (2) during filtering, air in the chamber 199 forms a cushion adversely affecting the oil pressure in the filter, and (3) the air could build up to a large volume to extend below the top of the filtering elements to thereby render part of the filtering elements ineffective. Another advantage of directing oil to the top of the filter is that when filtering is initiated, the entire filter can be preheated more quickly since the oil is flowing over all the parts of the filter.

Pressure differential valves 190 are employed to bypass oil around the filters when the oil pressure within the chamber 141 is undesirably high. If the filter elements should become clogged, the relief valves 190 would bypass flow to the outlet chambers 199 and 220 so that the engine bearings would still receive oil.

It is noted that the arrangement whereby there is provided two full flow-filter elements within the filter cartridge provides a full-flow filter which can be constructed to give many combinations of filter particle or micron retention. Thus, for a particular type of oil, it may be that the best results are achieved by having a first micron retention filter paper in one of the filter elements and a second micron retention filter paper in the other. Furthermore, filter paper can be made to give very accurate control of the micron retention. Thus, the invention involves the provision of a combination full-flow filter permitting great versatility in filtering.

It is not desired to be limited except as required by the following claims, the above description being by way of illustration only.

We claim:

1. A filter cartridge comprising an outer cylindrical can body having a cover at each end, an inner cylindrical can body concentrically contained within said outer can body and having a cover at each end, the respective covers of said can bodies being in overlapping relationship at each end thereof, a cylindrical gasket holding means having a radially directed flange at its outer end extending over its associated inner cover, means sealing the joint between each inner cover and said gasket holding means including an annular gasket positioned in sealing contact between said radially directed flange and said inner cover, said outer covers having central portions in engaging contact with said gasket holding means whereby the cooperating engagement between said gasket holding means and said covers serves to position said inner can body relative to said outer can body.

2. A filter cartridge according to claim 1 wherein said outer and said inner can bodies each contain a full-flow filter element and said gasket holding means includes a pair of cup-shaped members nested together and having inwardly projecting flanges between which another annular gasket is mounted and said central portions of said outer covers being folded over the upper cup-shaped member for engaging contact therewith.

3. A filter cartridge according to claim 2 wherein said inner can body includes a thin tube defining the inner wall thereof, said tube having a plurality of flow ports throughout the surface thereof, and including a helical spring extending within said tube to support the same against forces tending to collapse the same from the exterior thereof.

4. An oil filter comprising a housing, a filter cartridge including a pair of tubular full-flow filter elements, one of said filter elements being positioned concentrically within the other, said filter elements defining an annular space therebetween, inlet means for directing the flow of oil from the exterior of said housing into said annular space between said filter elements, said filter elements being constructed to direct liquid to flow from said annular space outwardly through the outer filter element and inwardly through the inner filter element, outlet means for directing the flow of liquid from a chamber externally of the outer filter element and from a chamber within the inner filter element to the exterior of said housing, each of said full-flow filter elements including a tightly folded, pleated filter paper arranged in an annular configuration, and means for mounting said filter so that the longitudinal axis of said filter elements extends vertically, said outlet means including a vertical tubular post extending through the chamber within the inner filter element, said post having relatively large passage means for the flow of oil from said last-mentioned chamber into the interior of the post, said post being closed at its lower end, extending upwardly to a location adjacent the upper end of said housing and providing a relatively large discharge port at such location for delivering oil to the upper end of the filter whereby all the oil which passes through said inner filter element to said chamber therewithin and said tube is discharged from said discharge port, said discharge port also serving to bleed air from the filter.

5. An oil filter according to claim 4 wherein said inner filter includes a thin tube defining the inner wall thereof, said thin tube having a plurality of ports therein for the flow of oil therethrough, and including a helical spring extending within said thin tube to support the same against collapsing when subjected to oil pressure on the exterior thereof.

6. An oil filter according to claim 4 wherein said inlet and outlet means each include a connection at a lower portion of said housing for delivering oil to and discharging oil from said housing.

References Cited

UNITED STATES PATENTS

| | | | |
|---|---|---|---|
| 2,387,368 | 10/1945 | Vokes | 210—323 X |
| 2,468,862 | 5/1949 | Briggs | 210—457 |
| 2,864,505 | 12/1958 | Kasten | 210—444 X |
| 3,167,507 | 1/1965 | Burhans et al. | 210—315 X |

FOREIGN PATENTS 708,813  5/1965  Canada.

REUBEN FRIEDMAN, Primary Examiner

FRANK A. SPEAR, Jr., Assistant Examiner

U.S. Cl. X.R.

210—315, 342, 438, 458, 493